United States Patent
Suzuki et al.

(10) Patent No.: US 6,539,461 B2
(45) Date of Patent: Mar. 25, 2003

(54) DATA SAVING METHOD AND EXTERNAL STORAGE DEVICE

(75) Inventors: Hiroyoshi Suzuki, Numazu (JP); Mamoru Toochi, Ube (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/275,401

(22) Filed: Mar. 24, 1999

(65) Prior Publication Data

US 2002/0138705 A1 Sep. 26, 2002

(30) Foreign Application Priority Data

Mar. 24, 1998 (JP) .......................... 10-075214

(51) Int. Cl.[7] .................. G06F 12/16; G06F 13/00
(52) U.S. Cl. ........................ 711/162; 707/204
(58) Field of Search .................. 707/204; 711/161, 711/162

(56) References Cited

U.S. PATENT DOCUMENTS

| | | | |
|---|---|---|---|
| 5,544,347 A | 8/1996 | Yanai et al. | |
| 5,742,792 A | 4/1998 | Yanai et al. | |
| 5,889,935 A | 3/1999 | Ofek et al. | |
| 5,901,327 A | 5/1999 | Ofek | |
| 5,960,216 A | 9/1999 | Vishlitzky et al. | |
| 6,064,880 A | * 5/2000 | Alanara .................. 455/419 |

FOREIGN PATENT DOCUMENTS

| | | |
|---|---|---|
| JP | 4311219 | 11/1992 |
| JP | 581147 | 4/1993 |
| JP | 5120110 | 5/1993 |
| JP | 06004223 | 1/1994 |
| JP | 06139027 | 5/1994 |
| JP | 07093101 | 4/1995 |
| JP | 07200191 | 8/1995 |
| JP | 07239759 | 9/1995 |
| JP | 08234916 | 9/1996 |
| JP | 10283121 | 10/1998 |

* cited by examiner

Primary Examiner—Jack A. Lane
(74) Attorney, Agent, or Firm—Antonelli, Terry, Stout & Kraus, LLP

(57) ABSTRACT

A data saving method, apparatus and computer program which operates in an information processing system including a first external storage device, a host device which performs data input and/or output operations to and/or from the first external storage device and a second external storage device. A connection is formed between the first external storage device and the second external storage device. The second external storage device is not connected to the host device. An operation is performed of automatically saving data from the first external storage into the second external storage device via the connection formed between the first external storage device and the second external storage device. The saving is performed based on configuration information stored in the first external storage device. The configuration information includes information for designating an execution start time of saving data to the second external storage device, and at least one of a data storing area and a data set name in the second external storage device at which stored data is to be stored and information for indicating at least one type of second external storage device.

7 Claims, 12 Drawing Sheets

FIG. 6  PROCESSING OF THE SERVICE PROCESSOR 22

PROCESSING OF THE CHANNEL INTERFACE CONTROLLERS 41 TO 45
FROM FIGS. 9 AND 13

PROCESSING OF THE CHANNEL INTERFACE CONTROLLERS 41 TO 45
FROM FIG. 10

DATA SAVING METHOD AND EXTERNAL STORAGE DEVICE

FIELD OF THE INVENTION

The present invention relates to a data saving data backup technique. More particularly, the present invention relates to a data saving, data backup, technique in an external storage device which is shared by two or more host devices.

BACKGROUND OF THE INVENTION

In recent years, with the trend of nonstop operation of a computer system, the importance of data backup is indispensable for a safe operation of the computer system. Consequently, various methods for performing data backup have been proposed.

For example, Japanese Patent Application No. 5-81147 discloses an automatic saving and restoring method for a volatile storage. The method detects whether a residual capacity of exists power in a power supply by a residual capacity detector and transfers the contents of the volatile storage to a non-volatile storage when the residual capacity is equal to or lower than a predetermined level. Japanese Patent Application No. 5-120110 discloses an automatic backup system for a file. The system performs data backup of a file which has been previously designated when communications via a Local Area Network (LAN) is not heavy. Japanese Patent Application No. 6-4223 discloses a disk copying system for executing a disk (storage medium) copy from a device suspected to have failed to another device when the copying is judged to be necessary due to the identification of the device suspected to have failed. Japanese Patent Application No. 6-139027 discloses a data backup technique for a disk array system. In a configuration having multiple disk drives becoming a disk array, spare drives, and a backup device are provided and controlled by a disk array controller. The spare drive is used as a data transfer buffer when transferring data transfer from the disk drives to the backup device. Japanese Patent Application No. 6-168080 discloses a technique for preventing old backup data from being erroneously used by recording the latest data update time and backup completion time when data backup for each of main and spare disks is performed in a data backup system. Thus, this technique in accordance with a setting of a switch by a job terminating program, the latest data update time and the backup completion time are collated with each backup from either the main or spare disk. Japanese Patent Application No. 6-309209 discloses a file backup method which provides a flag area in a part of file management information for specifying whether an automatic backup is necessary or not with respect to a file to be stored in an auxiliary storage. Thus, a backup is automatically performed when the flag area in the file management information specifies that a backup is necessary. Japanese Patent Application No. 8-212142 discloses a data backup system for a database which performs a data backup using a backup control file and a history file. Japanese Patent Application No. 9-50394 discloses an automatic data saving system in which an automatic activating unit, a saving unit, and the like are provided in a computer to which a direct access storage and a magnetic tape device are connected. Data backup is performed by a job control statement requesting a saving process created by the saving unit. Japanese Patent Application No. 9-101912 discloses a differential backup method which performs differential backup by providing a differential managing mechanism for recording/managing a backup generation IC and the like for each block in an external storage as a part of the kernel in which an operating system exists. Japanese Patent Application No. 10-283121 discloses a data backup system which executes a data backup without using a CPU, main memory unit or a system bus by judging which one of the main memory unit and local memory access on a standard I/O bus is to be performed by a bus controller. Japanese Patent Application NO. 8-234916 discloses automatic backup system without occupying a host device. Japanese Patent Application No. 7-239759 discloses backup system recording information of the disk array. Japanese Patent Application No. 7-200191 discloses disk array device which have a timer. Japanese Patent Application No. 7-93101 discloses backup system without using a bus. Japanese Patent Application No. 4-311219 discloses backup system without interfering a host device.

The above described conventional techniques except those described in Japanese Patent Application No. 6-4223 and Japanese Patent Application No. 6-139027 have a disadvantage in that a load is applied to the host device since the data backup is executed by processing performed by the host device. The conventional technique described in Japanese Patent Application No. 6-4223 saves data in a device reserved against failures by a disk error collecting unit and a medium copying unit. Thus, this conventional technique has a disadvantage that a motive for data saving is limited to a time only when a device is suspected to have failed being that errors are anticipated to occur frequently. The conventional technique described in Japanese Patent Application No. 6-139027 has to obtain information such as application range of a file system from a host computer. Accordingly, the advantage is that backup cannot be performed automatically.

SUMMARY OF THE INVENTION

The present invention provides a data saving method, apparatus and computer program which operates in an information processing system including a first external storage device and a host device which performs data input and/or output operations to and/or from the first external storage device. In the present invention, a connection is formed between the first external storage device and a second external storage device. The second external storage device is not connected to the host device. The present invention performs an operation of automatically saving data from the first external storage into the second external storage via the connection formed between the first external storage device and the second external storage device.

The saving is performed based on configuration information stored in the first external storage device. The configuration information includes information for designating an execution start time of saving data to the second external storage device, and at least one of a data storing area and a data set name in the second external storage device at which stored data is to be stored and information for indicating at least one type of second external storage device.

The present invention provides an operation of detecting a predetermined condition. The saving operation is performed in response to detection of the predetermined condition. The predetermined condition is at least one of a predetermined period of time, a predetermined number of data input/output operations, and a failure of the first external storage.

BRIEF DESCRIPTION OF THE DRAWINGS

The scope of the present invention will be apparent from the following detailed description, when taken in conjunction with the accompanying drawings, and such detailed description and specific examples, while indicating preferred embodiments of the invention, are given by way of illustration only, since various changes and modifications within the spirit and scope of the invention will become apparent to those skilled in the art from this detailed description, in which.

DETAILED DESCRIPTION OF THE INVENTION

Figure 1:
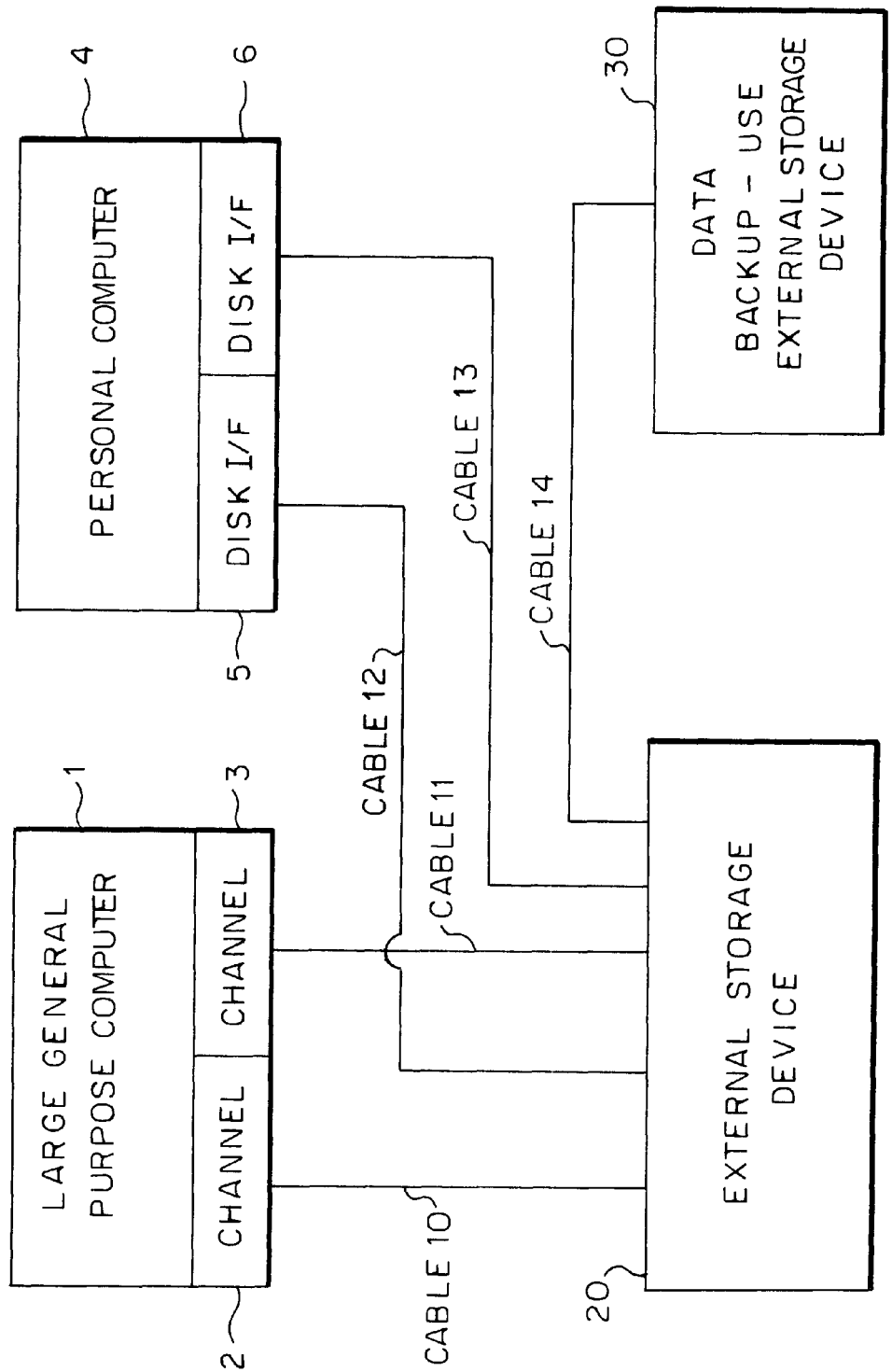
FIG. 1 is a block diagram illustrating the hardware configuration of an information processing system including external storage devices of the present invention.

FIG. 1 is a block diagram illustrating an example of a hardware configuration of an information processing system including external storage devices which perform the data saving operation of the present invention. The information processing system includes a large general purpose computer 1, a personal computer 4, cables 10 to 14, an external storage device 20, and a data backup-use external storage device 30. The external storage device 20 is connected by input/output (I/O) ports to channels 2 and 3 of the larger general purpose computer 1 and disk interface (I/F) 5 and 6 of the personal computer 4 via the cables 10 to 13. The external storage device 20 is also connected by an I/O port to the data back-up external storage device 30 via the cable 14. As representative examples of the external storage device 20, there are a magnetic disk subsystem such as a disk array, a semiconductor storage subsystem, an optical disk subsystem, and the like. As representative examples of the data backup-use external storage device 30, there are a magnetic tape subsystem, magnetic tape library subsystem, optical disk library subsystem, and the like in addition to those illustrated as representative examples of the external storage 20.

Figure 2:
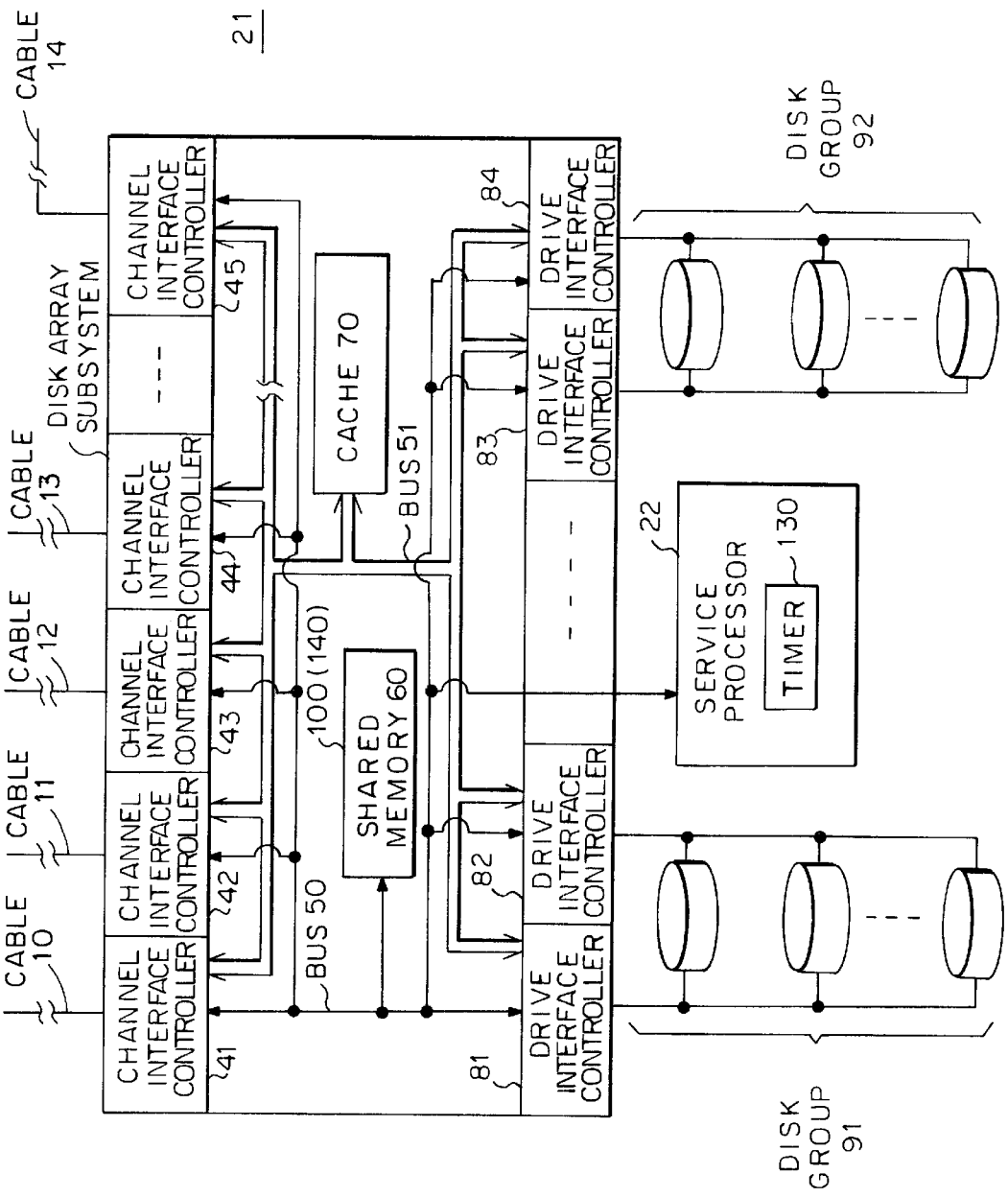
FIG. 2 is a block diagram illustrating the hardware configuration of a disk array subsystem as an example of the external storage device of the present invention.

A disk array subsystem including multiple magnetic disk devices is used as an example of the external storage device 20. FIG. 2 is a block diagram illustrating an example of the hardware configuration of a disk array subsystem 21 as an example of the external storage device 20 of the present invention as illustrated in FIG. 1. The disk array subsystem 21 includes a service processor 22, channel interface controller 41 to 45 (I/O ports), buses 50 and 51, a shared memory 60, a cache 70, drive interface controllers 81 to 84, and disk groups 91 and 92 each including multiple magnetic disk devices.

The service processor 22 has functions to set information necessary to perform automatic data backup which will be described below and to write the information into the shared memory 60 via the bus 50. The channel interface controllers 41 to 45 have functions to perform execution of commands from the large general purpose computer 1 and the personal computer 4 via the cables 10 to 14, data transfer between the large general purpose computer 1, the personal computer 4, and the data backup-use external storage device 30 and the cache 70 using the bus 51, and the issue of commands to the data backup-use external storage device 30. In order to realize the functions above, the channel interface controllers 41 to 45 refer to and update information on the shared memory 60 via the bus 50 and communication with the drive interface controllers 81 to 84 and the service processor 22.

The bus 50 is a communication control line connecting the channel interface controllers 41 to 45, the shared memory 60, the drive interface controllers 81 to 84, and the service processor 22. The bus 50 is used to perform the communication among the channel interface controllers 41 to 45, the drive interface controllers 81 to 84 and the service processor 22 and reference/update of information between the channel interface controllers 41 to 45, the drive interface controllers 81 to 84, the service processor 22 and the shared memory 60.

The bus 51 is used for data transfer from the large general purpose computer 1 and the personal computer 4 to the cache 70 via the cables 10 to 13 and the channel interface controllers 41 to 44, data transfer from the cache 70 to the large general purpose computer 1 and the personal computer 4 via the cables 10 to 13 and the channel interface controllers 41 to 44, data transfer from the cache 70 to the data backup-use external storage device 30 via the channel interface controller 45 and the cable 14, data transfer from the cache 70 to the disk groups 91 and 92 via the drive interface controllers 81 to 84, and data transfer from the disk groups 91 and 92 to the cache 70 via the drive interface controllers 81 to 84.

The shared memory 60 is a nonvolatile memory which stores information necessary for the channel interface controllers 41 to 44, the drive interface controllers 81 to 84, and the like to operate, information used for operating the invention that will be described below, and configuration information from the service processor 22 that will be described below. The cache 70 is a memory for temporarily storing write data from the large general purpose computer 1 and the personal computer 4 and read data from the disk groups 91 and 92.

The drive interface controllers 81 to 84 refer to and update information on the shared memory 60 using the bus 50 in response to requests from the channel interface controllers 41 to 45, thereby reading data from the disk groups 91 and 92 into the cache 70 and writing data from the cache 70 onto the disk groups 91 and 92. The disk groups 91 and 92 are arrayed disks which retain data written from the large general purpose computer 1 and the personal computer 4 into the cache 70.

Figure 3:
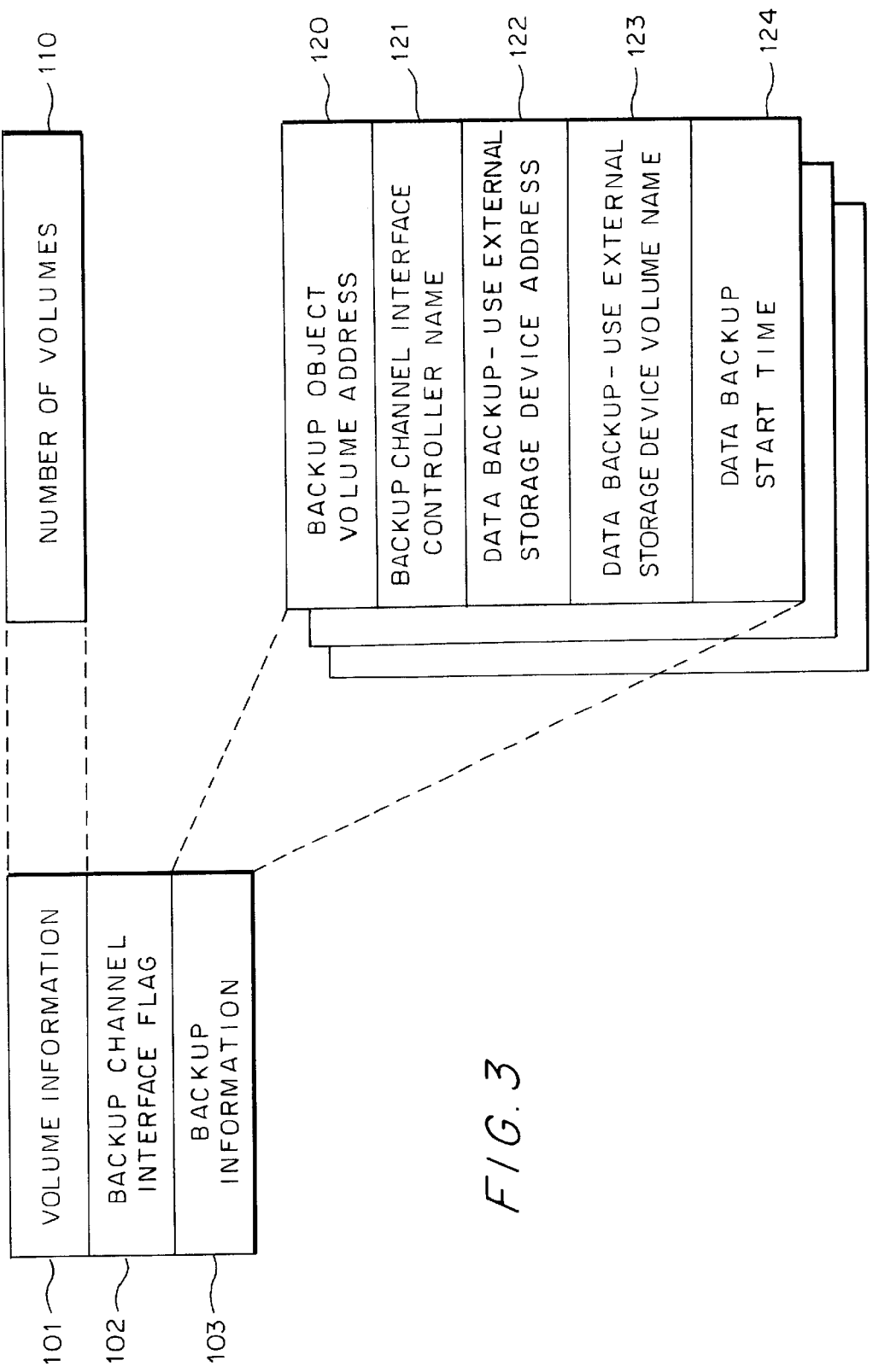
FIG. 3 is a conceptual diagram illustrating the structure of a configuration information table as one of pieces of control information of the present invention.

FIG. 3 is a conceptual diagram illustrating an example of the structure of a configuration information table 100 which is one of the pieces of control information used to implement the data saving operation of the present invention. The contents of the configuration information table 100 are set by the service processor 22. After completion of the setting, the service processor 22 writes the configuration information table 100 in the shared memory 60. The configuration information table 100 in the shared memory 60 is referred to mainly by the channel interface controllers 41 to 45.

An example of the structure of the configuration information table 100 will be explained in more detail. The configuration information table 100 includes volume information 101, a backup channel interface flag 102, and backup information 103. The number of volumes 110 is the number of volumes in the disk array subsystem 21. The backup channel interface flag 102 illustrates the channel interface controllers 41 to 45 to which the data backup-use external storage device 30 is connected via the cable 14. The backup channel interface flag 102 is constructed by units of bits in which bit 0 denotes the channel interface controller 41, bit 1 denotes the channel interface controller 42, and so on. In the backup channel interface flag 102, bits in two or more positions can be set to 1.

The backup information 103 includes by a backup object volume address 120, a backup channel interface controller name 121, a data backup-use external storage device address 122, a data backup-use external storage device volume name 123, and a data backup start time 124. When two or more backup object volume addresses 120 exist, each entry includes the backup object volume address 120, the backup channel interface controller name 121, the data backup-use external storage device volume name 123, and the data backup start time 124. The number of such entries corresponds to the number of backup object volume addresses 120 exist. In FIG. 3, in order to simplify the explanation of the embodiment, an example in which only one backup object volume address 120 exists is illustrated.

Figure 4:
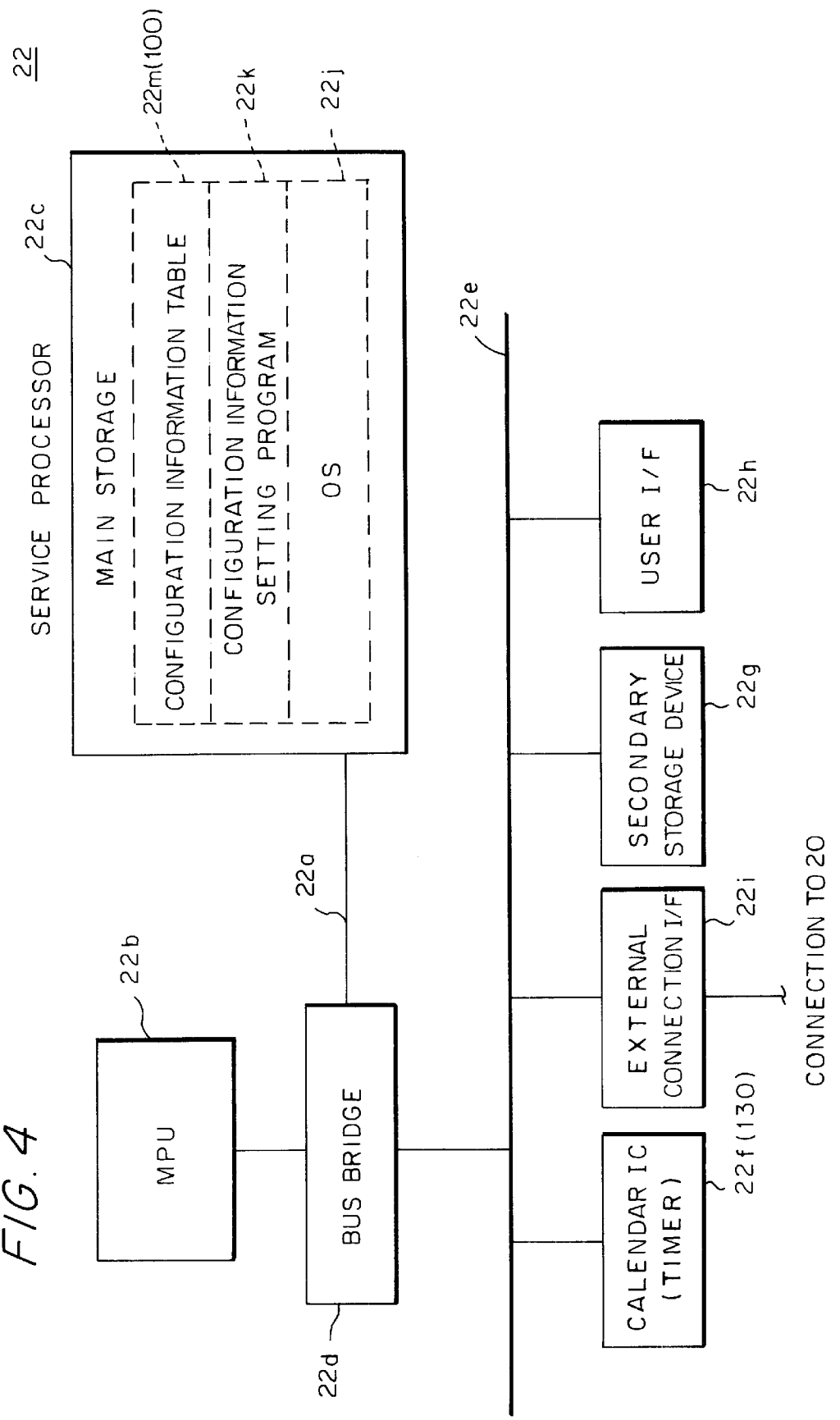
FIG. 4 is a conceptual diagram illustrating the configuration of a timer of a service processor of the present invention.

FIG. 4 is a conceptual diagram illustrating an example of the configuration of the service processor 22 including a timer 130, which is used to implement the data saving operation of the present invention. The timer 130 is controlled by the hardware existing in the service processor 22. The timer 130 serves as a trigger indicating that a predetermined condition has occurred, upon which the data backup is started. When the value indicated by the timer 130 coincides with the data backup start time 124 in the backup information 103 in the configuration information table 100, the service processor 22 instructs the channel interface controllers 41 to 45 to start the data backup.

The service processor 22 is constructed by, for example, an information processing device such as a personal computer and a work station and has the configuration illustrated in FIG. 4 as an example. For instance, a microprocessor (MPU) 22b, a main storage 22c, and a bus bridge 22d are connected via a system bus 22a. Further, a calendar IC 22f which functions as the timer 130, a secondary storage device 22g, a user interface 22h consisting of a display, a keyboard, etc., external connection I/F 22i used for the connection with the disk array subsystem 21, and the like are connected to the bus bridge 22d via a general bus 22e. In the main storage 22c, a general purpose operating system (OS) 22j, a configuration information setting program 22k, a configuration information table 22m (100), and the like are stored. An operation of the present invention such as that illustrated in the flowchart in FIG. 6 will be described below.

Figure 5:
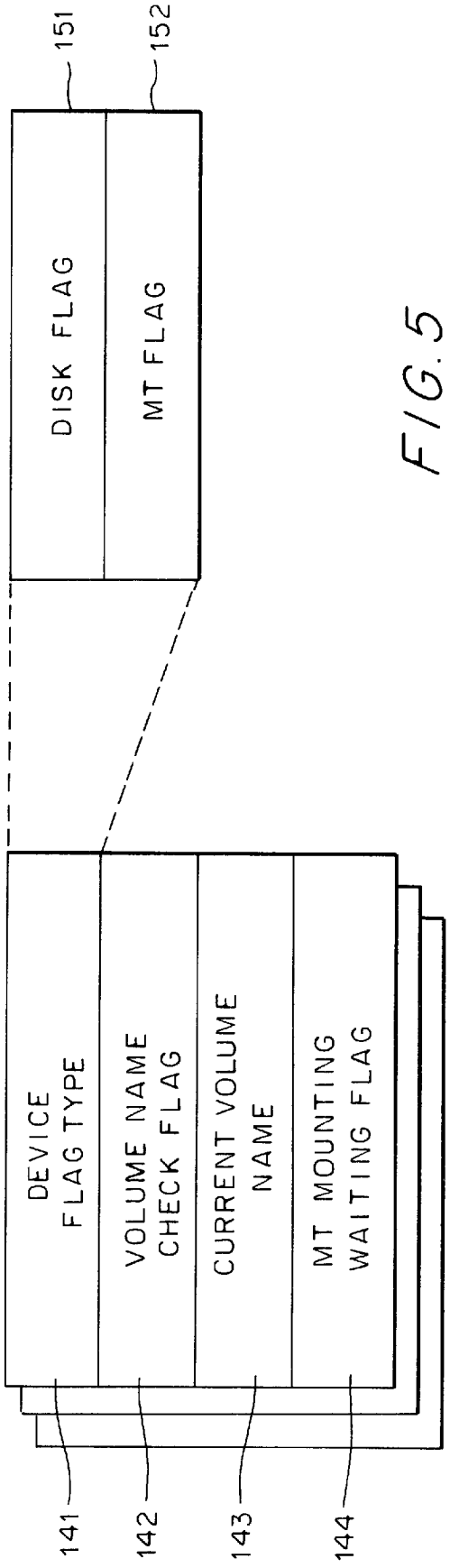
FIG. 5 is a conceptual diagram illustrating the configuration of a backup information table as one of pieces of information of the present invention.

FIG. 5 is a conceptual diagram illustrating an example of the structure of a backup information table 140. The backup information table 140 exists in each of the channel interface controllers 41 to 45 or on the shared memory 60. The backup information table 140 is constructed to include a device type flag 141, a volume name check flag 142, a current volume name 143, and an MT mounting waiting flag 144. The number of backup information tables 140 corresponds to the device addresses of the data backup-use external storage device 30 connected via the cable 14.

The device type flag 141 includes a disk flag 151 and an MT flag 152. The disk flag 151 is set to 1 when the data backup-use external storage device 30 is any of a magnetic disk subsystem such as a disk array, a semiconductor storage subsystem, an optical disk subsystem, or an optical disk library subsystem and set to 0 when the data backup-use external storage device 30 is a subsystem other than any of the above-mentioned subsystems. The MT flag 152 is set to 1 when the data backup-use external storage device 30 is a magnetic tape subsystem or a magnetic tape library subsystem and set to 0 when the data backup-use external storage device 30 is a subsystem other than the above-mentioned subsystems.

The volume name check flag 142 is set to 1 when a check of the disk volume name or magnetic tape volume name has been completed and set to 0 when the data backup is completed. Generally, a single volume name is given to a disk device volume, while a single volume name is given to a volume of magnetic tape.

The current volume name 143 illustrates a name of a disk volume or a magnetic tape volume to which the data backup is being performed at present. The MT mounting waiting flag 144 is set to 1 in a state that a magnetic tape volume is waiting for being mounted on a magnetic tape device and set to 0 in a state other than the above.

Figure 6:
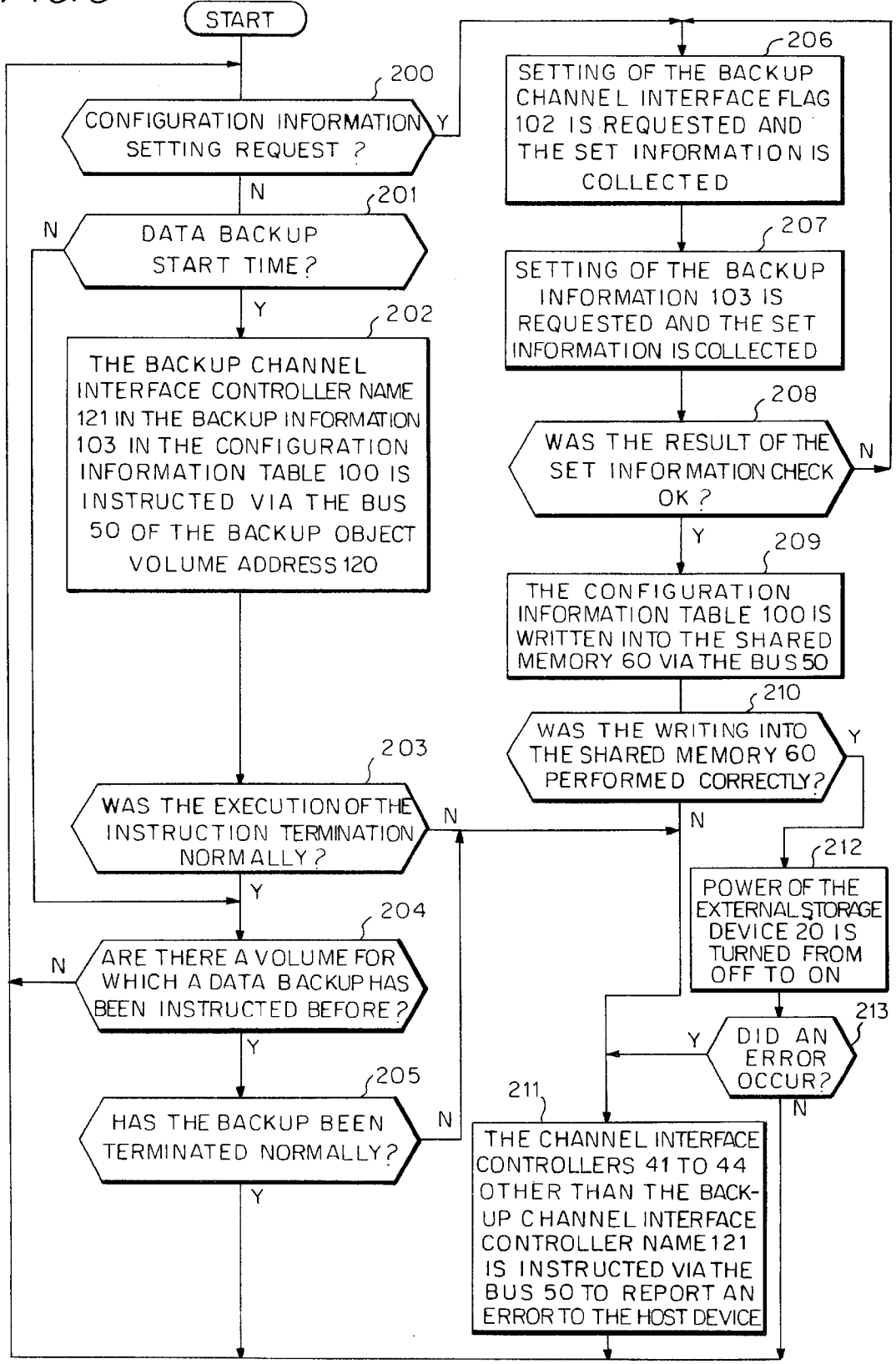
FIG. 6 is a flowchart illustrating the operation of an external storage device of the present invention.

An example of the processings performed by the service processor 22 is illustrated in the flowchart of FIG. 6. This flowchart will be explained by referring to FIGS. 2 to 4. The flowchart may, for example, correspond to a computer program executable by a computer. The computer program can, for example, be stored on a storage medium such as semiconductor memory, floppy disk, CD ROM, etc., and installed to the memory of the computer. The computer program can alternatively be provided to the computer by a network connected to the computer such as, for example, local area network, internet, etc. Each of the steps of the flowchart can, for example, correspond to one or more instructions of the computer program.

As per the above, FIG. 6 illustrates a processing flow of the service processor 22. However, in the following description in order to simplify the explanation, the channel interface controller 45 will be set as the name of the backup channel interface controller 121 in the backup information 103.

First, it is determined whether a configuration information setting request has been issued (step 200). The configuration information setting request is a request for setting a series of information of the configuration information table 100. If a configuration information setting request has been issued as per step 200, processing proceeds to step 206. If no configuration information setting request has been issued as per step 200, processing proceeds to step 201. In step 201, a check is performed to determine whether the present time is a data backup start time or not. More specifically, a determination whether the data backup start time 124 in the backup information 103 coincides with the value of the timer 130 is performed. If the present time is not the data backup start time as per step 201, processing proceeds to step 204. If the present time is the data backup start time as per step 201, processing proceeds to step 202. In step 202, the backup channel interface controller name 121 in the backup information 103 in the configuration information table 100 is extracted and the channel interface controller 45 indicated with the backup channel interface controller name 121 is instructed via the bus 50 to back up the data at the backup object volume address 120. More specifically, the channel interface controller 45 is instructed via the bus 50 to back up the data at the backup object volume address 120.

Next, in step 203, a determination whether the execution of the data backup instruction given to the channel interface controller 45 has been terminated normally is performed. If the execution of the data backup instruction has been terminated normally as per step 203, processing proceeds to step 204. A determination whether there is a volume for which data backup has been instructed before is performed. If there is no volume for which data backup has been instructed before as per step 204, processing returns to step 200. If there is a volume for which data backup has been instructed before as per step 204, processing proceeds to step 205. In step 205, a determination whether the data backup of the volume for which the data backup has been instructed before has been normally terminated is performed. If the data backup of the volume for which data backup has been instructed before has been terminated normally as per step 205, processing returns to step 200. If the data backup of the volume for which data backup has been instructed before has not been terminated normally as per step 205, processing proceeds to step 211.

The configuration information setting request as per step 200 is explained as follows. In step 206, the setting of the backup channel interface flag 102 is requested and the setting information is collected. In the embodiment, the backup channel interface flag 102 is set to the channel interface controller 45. The setting of the backup information 103 is requested and the backup information 103 which has been set is collected in step 207. In the embodiment, the channel interface controller 45 is set in the backup channel interface controller name 121 in the backup information 103.

The information of the configuration information table 100 which has been set is checked in step 208. More specifically, the backup channel interface flag 102 and the backup channel interface controller name 121 in the backup information 103 are checked for validity. If the check of the information in step 208 which has been set is not OK, processing returns to step 206. If the check of the information which has been set is OK in step 208, processing proceeds to step 209. In step 209, the configuration information table 100 is written into the shared memory 60 via the bus 50.

In step 210, whether the configuration information table 100 has been correctly written into the shared memory 60 is checked. If the configuration information table 100 has been correctly written into the shared memory 60 in step 210, processing proceeds to step 212. If the configuration information table 100 has not been correctly written into the shared memory 60 in step 210, processing proceeds to step 211. In step 211, it is instructed via the bus 50 to report an error to the channel interface controllers 41 to 44 other than the channel interface controller (the channel interface controller 45 in the embodiment) indicated by the backup channel interface controller name 121. After that, processing returns to step 200.

After the configuration information table 100 has been correctly written into the shared memory 60 in step 210, rebooting by turning the power of the external storage device 20 from OFF to ON is performed in step 212, thereby making the channel interface controllers 41 to 45 collect the configuration information table 100 on the shared memory 60. In step 213, a check is made to see whether or not an error has occurred in the rebooting which has been made by turning the power source of the external storage 20 from OFF to ON. If an error has occurred in step 213, the routine proceeds to step 211. If no error has occurred in step 213, the routine returns to step 200.

An example of the operations performed as a result of the processing of the channel interface controllers 41 to 45 are illustrated in the flowcharts in FIGS. 7 to 13. These flowcharts will be explained by using FIGS. 1 to 5. Each of the flowcharts may, for example correspond to a computer program executed by a computer. The computer program can, for example, be stored on a storage medium such as semiconductor memory, floppy disk, CD ROM, etc., and installed to the memory of the computer. The computer program can alternatively be provided to the computer by a network connected to the computer such as, for example, local area network, internet, etc. Each of the steps of the flowchart can, for example, correspond to one or more instructions of the computer program.

Although the channel interface controllers 41 to 45 have the three processing functions as mentioned above, the data backup processing performed by the data backup-use external storage device 30 will be explained below. In the embodiment of the present invention, to simplify the explanation, a case will be described below in which the data backup-use external storage device 30 is connected to the channel interface controller 45 via the cable 14. The number of the backup object volume addresses 120 in the backup information 103 in the configuration information table 100 is one. That is, there is a single entry including the backup object volume address 120, the backup channel interface controller name 121, the data backup-use external storage device address 122, the data backup-use external storage device volume name 123, and the data backup start time 124. The backup channel interface controller name 121 and the backup channel interface flag 102 are set to the channel interface controller 45.

First, the flowchart in FIG. 7 will be explained. Prior to step 301 monitoring is performed to determine whether an input/output (I/O) request has been received (step 300A). If an I/O request has been received then the I/O request is performed (step 300B). If no I/O request has been received or the I/O request has been performed, then processing proceeds to step 301. In step 301, a determination whether a notification on completion of data reading from the disk groups 91 and 92 has been sent from the drive interface controllers 81 to 84 is performed. If no data reading completion notification has been sent from the drive interface controllers 81 to 84 in step 301, the configuration information table 100 on the shared memory is read in step 302. In step 303, a determination whether the backup channel interface flag 102 of any of the channel interface controllers (any of the channel interface controllers 41 to 45) is 1 is performed. If none of the channel interface flags 102 is 1 as per step 303, the routine returns to step 301. Since the backup channel interface flag 102 is set to the channel interface controller 45, processing proceeds to step 304.

In step 304, a check is performed to determine whether there is a data backup request from the service processor 22. If no data backup request has been made from the service processor 22 as per step 304, processing returns to step 301. If the data backup request has been performed from the service processor 22 as per step 304, processing proceeds to step 305. The data backup-use external storage device address 122 in the backup information 103 is acquired in step 305 and processing proceeds to step 306. In step 306, the device type information at the data backup-use external storage device address 122 is acquired via the cable 14. In step 307, a check is performed to determine whether the device type information at the data backup-use external storage device address 122 has been acquired. If the acquisition of the device information at the data backup-use external storage device address 122 has failed as per step 307, processing proceeds to step 312. If the acquisition of the device information at the data backup-use external storage device address 122 has succeeded in step 307, processing proceeds to step 308.

In step 308, a determination whether the device type is that of a disk system is performed. The device type of the disk system in step 308 is a magnetic disk subsystem such as a disk array, semiconductor storage subsystem, optical disk subsystem, optical disk library subsystem, or the like. If the device type is not that of the disk system in step 308, processing proceeds to step 310. If the device type is that of the disk system in step 308, processing proceeds to step 309. The disk flag 151 in the device type flag 141 in the backup information table 140 is set to 1 in step 309 and processing proceeds to step 501 in FIG. 9. In step 310, a check is made to determine whether the device type is that of an MT (magnetic tape, hereafter, abbreviated as MT) or an MT library (magnetic tape library, hereafter, abbreviated as MT library).

If the device type is not that of the MT or MT library as per step 310, processing proceeds to step 312. If the device type is that of the MT or MT library as per step 310, processing proceeds to step 311. The MT flag 152 in the device type flag 141 in the backup information table 140 is set to 1 in step 311 and processing proceeds to step 601 in FIG. 10. In step 312, the data backup abnormal termination is notified to the service processor 22 via the bus 50 owing to an error. The flowchart of FIG. 8 will be explained next. FIG. 8 illustrates an example of the processing flow after the notification on completion of data reading from the disk groups 91 and 92 is notified by the drive interface controllers 81 to 84 in step 301 in FIG. 7.

In step 401, a check is made to determine whether the disk flag 151 in the backup information table 140 is 1. If the disk flag 151 in the backup information table 140 is "1" in step 401, the routine proceeds to step 501 in FIG. 9 to perform the data backup for the disk. If the disk flag 151 in the backup information table 140 is not "1" in step 401, the routine proceeds to step 402. In step 402, a determination whether the MT flag 152 in the backup information table 140 is 1 is performed. If the MT flag in the backup information table 140 is 1 in step 402, processing proceeds to step 601 in FIG. 10. If the MT flag 152 in the backup information table 140 is not 1 in step 402, processing proceeds to step 710 in FIG. 11.

Figure 9:
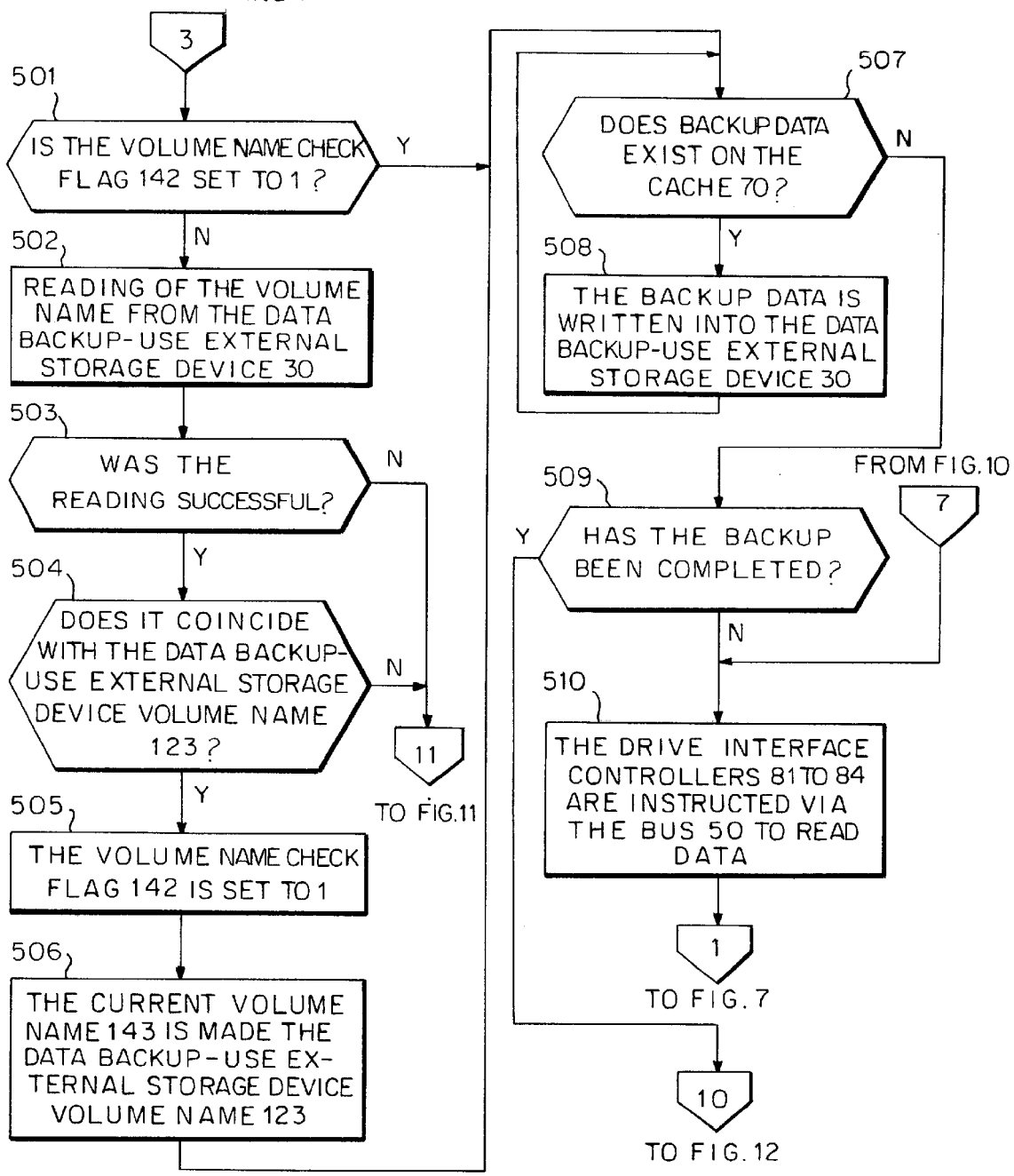
FIG. 9. Is a flowchart illustrating the operation of an external storage device of the present invention.

The flowchart of FIG. 9 will be explained next. FIG. 9 illustrates an example of the process flow for performing the data backup when the data backup-use external storage device 30 is that of a disk system. First, in step 501, a determination whether the volume name check flag 142 in the backup information table 140 is 1 is performed. The volume name check flag 142 in the backup information table 140 is the flag which indicates that the check of the volume name of the data backup-use external storage device 30 has been completed. If the volume name check flag 142 in the backup information table 140 is "1" in step 501, processing proceeds to step 507. If the volume name check flag 142 in the backup information table 140 is "0" in step 501, processing proceeds to step 502. In step 502, the volume name is read from the data backup-use external storage device 30.

A determination whether the volume name has been successfully read from the data backup-use external storage device 30 is performed in step 503. If the reading of the volume name of the data backup-use external storage device 30 has failed in step 503, processing proceeds to step 710 in FIG. 11. If the volume name of the data backup-use external storage device 30 has been successfully read in step 503, processing proceeds to step 504. In step 504, a check is performed to determine to see whether the volume name read from the data backup-use external storage device 30 coincides with the data backup-use external storage device volume name 123. If the volume name read from the data backup-use external storage device 30 does not coincide with the data backup-use external storage device volume name 123 in step 504, processing proceeds to step 710 in FIG. 11. If the volume name read from the data backup-use external storage device 30 coincides with the data backup-use external storage device volume name, processing proceeds to step 505. The volume name check flag 142 in the backup information table 140 is set to "1" in step 505. The current volume name 143 in the backup information table 140 is newly set to the data backup-use external storage device volume name 123 in step 506.

In step 507, a check is performed to determine whether there is backup data to be written into the data backup-use external storage device 30 on the cache 70. When there is no backup data to be written into the data backup-use external storage device 30 on the cache 70 in step 507, processing proceeds to step 509. When there is backup data to be written into the data backup-use external storage device 30 on the cache 70 in step 507, processing proceeds to step 508. The backup data is written into the data backup-use external storage device 30 in step 508 and the routine returns to step 507.

A determination whether the data backup has been completed is performed in step 509. If the data backup has been completed in step 509, processing proceeds to step 801 in FIG. 12. If the data backup has not been completed in step 509, processing proceeds to step 510. In step 510, the drive interface controllers 81 to 84 are instructed via the bus 50 to read the backup data. After step 510 is done, processing returns to step 301 in FIG. 7.

Figure 10:
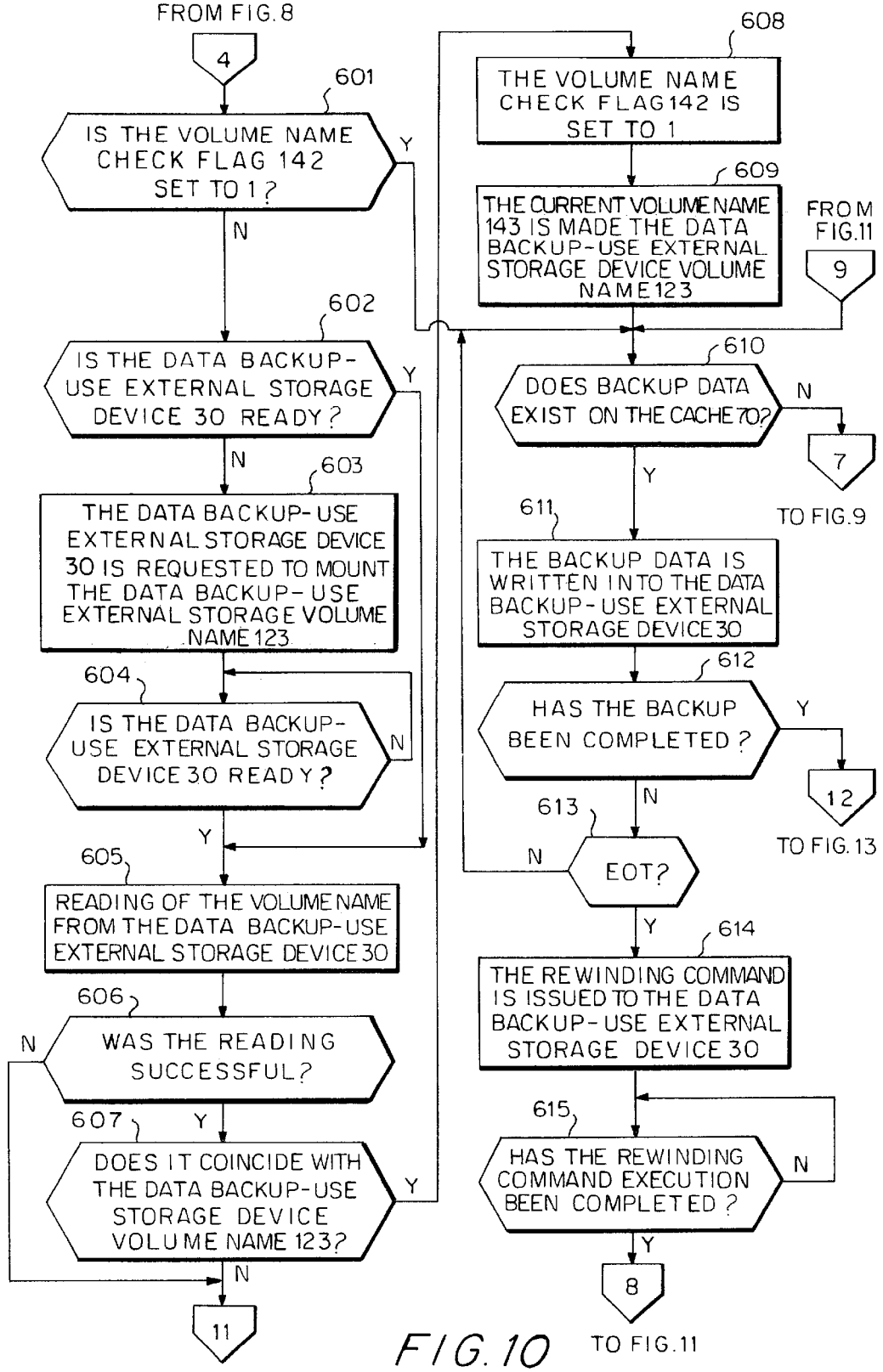
FIG. 10 is a flowchart illustrating the operation of an external storage device of the present invention.

The flowchart in FIG. 10 will be explained next. FIG. 10 illustrates an example of a processing flow for performing the data backup when the data backup-use external storage device 30 is that of an MT system. First, in step 601, a determination whether the volume name check flag 142 in the backup information table 140 is 1 is performed. If the volume name check flag 142 in the backup information table 140 is "1" in step 601, processing proceeds to step 610. If the volume name check flag 142 in the backup information table 140 is "0" in step 601, processing proceeds to step 602.

In step 602, a determination whether the data backup-use external storage device 30 is in the ready status is performed. If the data backup-use external storage device 30 is in the ready status in step 602, processing proceeds to step 605. If the data backup-use external storage device 30 is not in the ready status in step 602, processing proceeds to step 603. A request for mounting the data backup-use external storage device volume name 123 is made to the data backup-use external storage device 30 in step 603 and processing proceeds to step 604.

In step 604, a check is performed to determine whether the data backup-use external storage device 30 is in the ready status. If the data backup-use external storage device 30 is in the ready status in step 604, processing proceeds to step 605. If the data backup-use external storage device 30 is not in the ready status in step 604, processing returns to step 604 and waits for the data backup-use external storage device 30 to enter the ready status. In step 605, the volume name is read from the data backup-use external storage device 30. In step 606, a determination whether the volume name has been successfully read from the data backup-use external storage device 30 is performed. If the reading of the volume name of the data backup-use external storage device 30 has failed in step 606, processing proceeds to step 710 in FIG. 11. If the volume name of the data backup-use external storage device 30 has been successfully read in step 606, processing proceeds to step 607.

In step 607, a check is performed to determine whether the volume name read from the data backup-use external storage device 30 coincides with the data backup-use external storage device volume name 123. If the volume name read from the data backup-use external storage device 30 does not coincide with the data backup-use external storage device volume name 123 in step 607, processing proceeds to step 710 in FIG. 11. When the volume name read from the data backup-use external storage device 30 coincides with the data backup-use external storage device volume name 123 in step 607, processing proceeds to step 608. The volume name check flag 142 in the backup information table 140 is set to "1" in step 608. The current volume name 143 in the backup information table 140 is newly set to the data backup-use external storage device volume name 123.

In step 610, a check is performed to determine whether there is backup data to be written into the data backup-use external storage device 30 on the cache 70. If there is no backup data to be written into the data backup-use external storage device 30 on the cache 70 in step 610, processing proceeds to step 510 in FIG. 9. When there is the backup data to be written into the data backup-use external storage device 30 on the cache 70 in step 610, processing proceeds to step 611. The backup data is written into the data backup-use external storage device 30 in step 611 and processing proceeds to step 612. In step 612, a determination whether the data backup has been completed is performed. If the data backup has been completed in step 612, processing proceeds to step 901 in FIG. 13. If the data backup has not been completed in step 612, processing proceeds to step 613.

In step 613, a check is performed to determine whether the data backup-use external storage device 30 is positioned at End of Time (E.O.T.) which indicates the termination of a magnetic tape. If the data backup-use external storage device 30 is positioned at the E.O.T. in step 613, processing proceeds to step 614. If the medium in the data backup-use external storage device 30 is not positioned at the E.O.T. in step 613, processing returns to step 610. In step 614, since the medium in the data backup-use external storage device 30 is positioned at E.O.T., the magnetic tape has to be rewound. For this purpose, a rewinding command is issued to the data backup-use external storage device 30.

In step 615, a determination whether the data backup-use external storage device 30 has completed the rewinding command execution is performed. If the data backup-use external storage device 30 has completed execution of the rewinding command in step 615, processing proceeds to step 701 in FIG. 11. If the data backup-use external storage device 30 has not completed execution of the rewinding command in step 615, processing returns to step 615 and waits for the end of execution of the rewinding command of the data backup-use external storage device 30.

Figure 11:
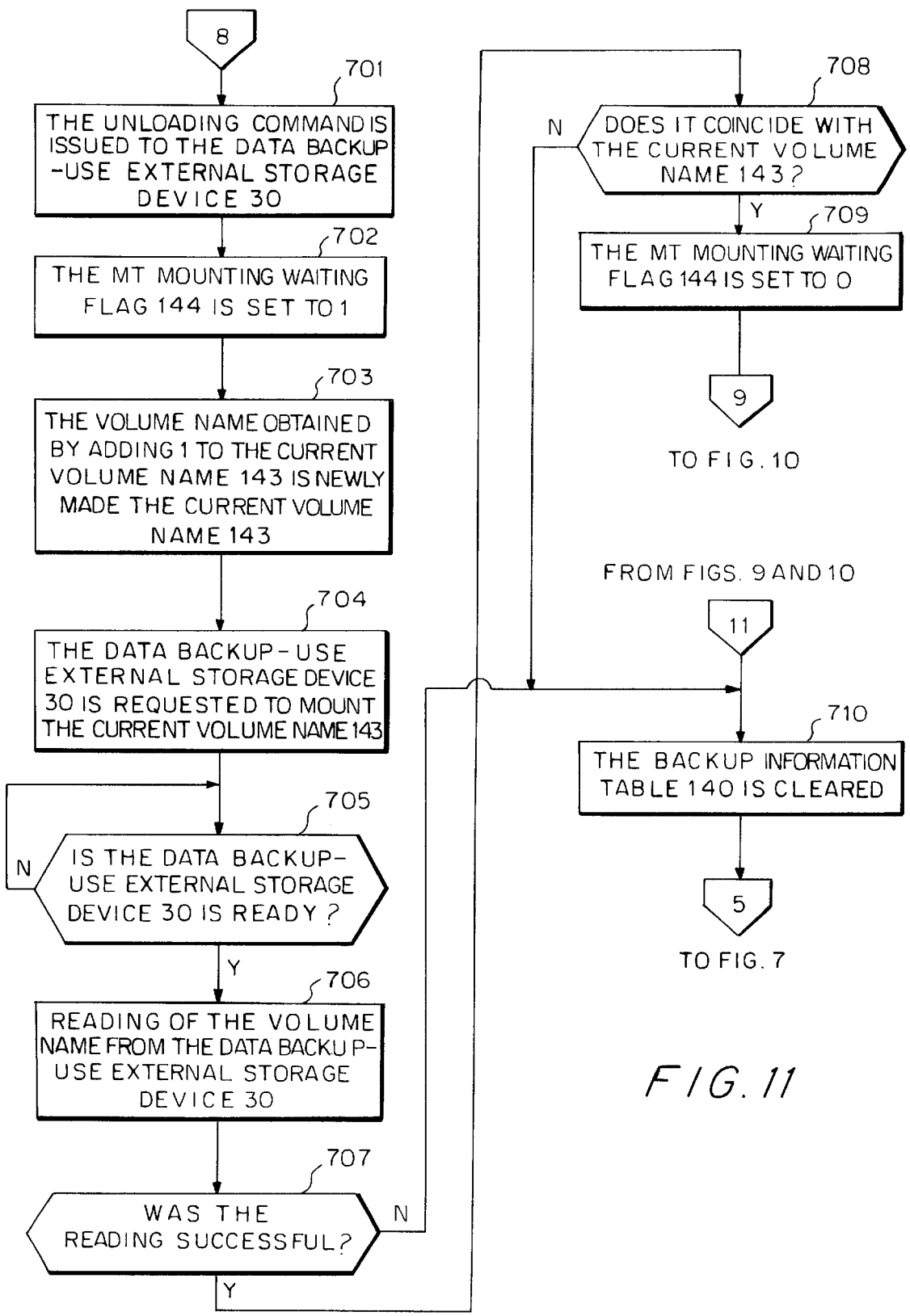
FIG. 11 is a flowchart illustrating the operation of an external storage device of the present invention.

The flowchart of FIG. 11 will be explained next. FIG. 11 illustrates an example of the processing flow for unloading a volume of a magnetic tape and requesting a mounting of the next volume of the magnetic tape when the data backup-use external storage device 30 is that of an MT system. In step 701, an unloading command is issued to the data backup-use external storage device 30. In step 702, the MT mounting waiting flag 144 in the backup information table 140 is set to 1. In step 703, a volume name obtained by adding 1 to the current volume name 143 in the backup information table 140 is newly made the current volume name 143 in the backup information table 140. Generally, the volume name of the magnetic tape is given by a combination of alphanumeric characters. For example, a magnetic tape volume name such as SSCO01 is typical. More specifically, in step 703, when the previous magnetic tape volume name is SSCO01, the magnetic tape volume name of SSCO02 is newly made the current volume name 143 in the backup information table 140.

A request to mount the current volume name 143 in the backup information table 140 is made to the data backup-use external storage device 30 in step 704 and processing proceeds to step 705. In step 705, a determination whether the data backup-use external storage device 30 is in the ready status is performed. When the data backup-use external storage device 30 is in the ready status in step 705, processing proceeds to step 706. When the data backup-use external storage device 30 is not in the ready status in step 705, processing returns to step 705 and waits the data backup-use external storage device 30 to enter the ready status. In step 706, the volume name is read from the data backup-use external storage device 30.

In step 707, a determination whether the volume name has been successfully read from the data backup-use external storage device 30 is performed. If the reading of the volume name of the data backup-use external storage device 30 has failed in step 707, processing proceeds to step 710. If the reading of the volume name of the data backup-use external storage device 30 succeeded in step 707, processing proceeds to step 708. In step 708, a determination whether the volume name read from the data backup-use external storage device 30 coincides with the current volume name 143 in the backup information table 140 is performed. When the volume name read from the data backup-use external storage device 30 does not coincide with the current volume name 143 in the backup information table 140, processing proceeds to step 710. When the volume name read from the data backup-use external storage device 30 coincides with the current volume name 143 in the backup information table 140 in step 708, processing proceeds to step 709.

The MT mounting waiting flag 144 in the backup information table 140 is set to "0" in step 709 and the routine proceeds to step 610 in FIG. 10. In step 710, the backup information table 140 is cleared in order to cope with occurrence of an error. To be concrete, all of the device type flag 141 (disk flag 151 and MT flag 152), the volume name check flag 142, the current volume name 143, and the MT mounting waiting flag 144 in the backup information table 140 are cleared. After completion of the processing of step 710, processing proceeds to step 312 in FIG. 7.

Figure 12:
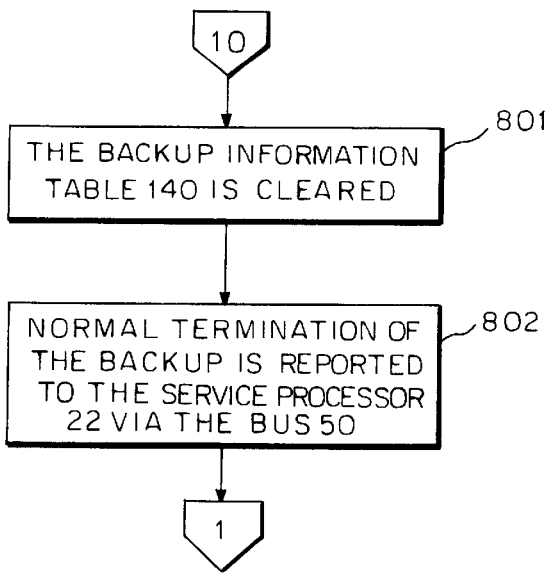
FIG. 12 is a flowchart illustrating the operation of an external storage device of the present invention.

The flowchart in FIG. 12 will be explained next. FIG. 12 illustrates an example of the processing flow after completion of the data backup to the data backup-use external storage device 30. In step 801, the backup information table 140 is cleared. More specifically, all of the device type flag 141 (the disk flag 151 and MT flag 152), the volume name check flag 142, the current volume name 143, and the MT mounting waiting flag 144 in the backup information table 140 are cleared. The normal termination of data backup is reported to the service processor 22 via the bus 50 in step 802 and processing is returned to step 301 in FIG. 7.

Figure 13:
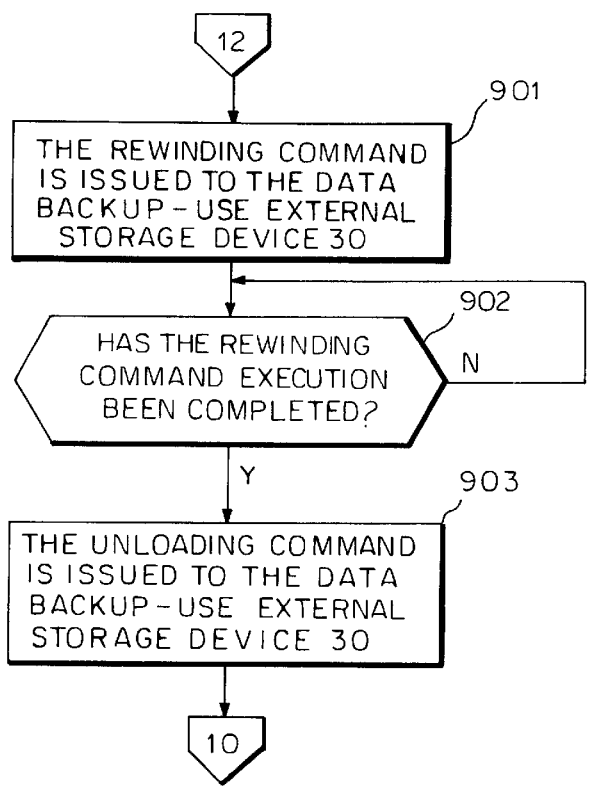
FIG. 13 is a flowchart illustrating the operation of an external storage device of the present invention.

The flowchart in FIG. 13 will be explained next. FIG. 13 illustrates an example of a processing flow after completion of the data backup when the data backup-use external storage device 30 is that of the MT (magnetic tape) system. Since the MT is a portable medium, it is necessary to unload the volume of the magnetic tape after completion of the data backup. In step 901, a rewinding command is issued to the data backup-use storage device 30 in order to rewind the magnetic tape.

In step 902, a determination whether the data backup-use external storage device 30 has completed the execution of the rewinding command is performed. When execution of the rewinding command in the data backup-use external storage device 30 has been completed in step 902, processing proceeds to step 903. When the rewinding command execution in the data backup-use external storage device 30 has not been completed in step 902, the routine returns to step 902 and waits for execution of the end of the rewinding command in the data backup-use external storage device 30. In step 903, an unloading command is issued to the data backup-use external storage device 30 in order to unload the volume of the magnetic tape and processing proceeds to step 801 in FIG. 12.

According to the embodiment, the data backup of the data on the external storage device 20 to the data backup-use external storage device 30 can be executed between the external storage device 20 and the data backup-use external storage device 30 without the intervention of a host device such as the large general purpose computer 1 and the personal computer 4, so that the load on the host device can be reduced. The data backup can be automatically performed between the external storage device 20 and the data backup-use external storage device 30 without requiring the intervention of the host device such as the large general computer 1 and the personal computer 4.

Further, various data saving operations such as, for example, saving of any data from any motive in units of any data set such as a volume can be performed irrespective of an occurrence of an error in the disk groups 91 and 92 according to the control information set in the configuration information table 100 on the shared memory 60 in the disk array subsystem 21.

In the embodiment, in order to simplify the explanation of the invention, the explanation has been made in a situation where the data backup-use external storage device 30 is connected to the channel interface controller 45 via the cable 14, the number of the backup object volume addresses 120 in the backup information 103 in the configuration information table 100 is one that is, a single entry exists which includes the backup object volume address 120, the backup channel interface controller name 121, the data backup-use external storage device address 122, the data backup-use external storage device volume name 123, and the data backup start time 124, and the backup channel interface controller name 121 and the backup channel interface flag 102 are set to the channel interface controller 45. The invention can also be applied to a case where two or more backup object volume addresses 120 in the backup information 103 in the configuration information table 100 exist.

Thus, even if two or more entries exist each of which includes the backup object volume address 120, the backup channel interface controller name 121, the data backup-use external storage device address 122, the data backup-use external storage device volume name 123, and the data backup start time 124, two or more disk volumes and two or more magnetic tape devices exist in the data backup-use external storage device 30, the invention can be applied.

The timer 130 is positioned in the service processor 22 in the embodiment. However, the invention can also be applied when the timer 130 is positioned in the external storage device 20.

Furthermore, by providing a counter for the I/O (input/output) count (read/write I/O count or write I/O count) per volume or a counter table for the read/written byte count (or the written byte count will do also) and by referring to and updating the I/O counter table or the read/written byte counter table fore each volume on the shared memory 60 when the function of the channel interface controllers 41 to 45 (that is, execution of commands from the large general purpose computer 1 or the personal computer 4 or data transfer between the large general purpose computer 1 or the personal computer 4 and the cache 70 using the bus 51) is executed, the I/O count per volume or the read/written byte count per volume can be used instead of the timer 130 as the trigger to start the data backup operation.

Figure 7:
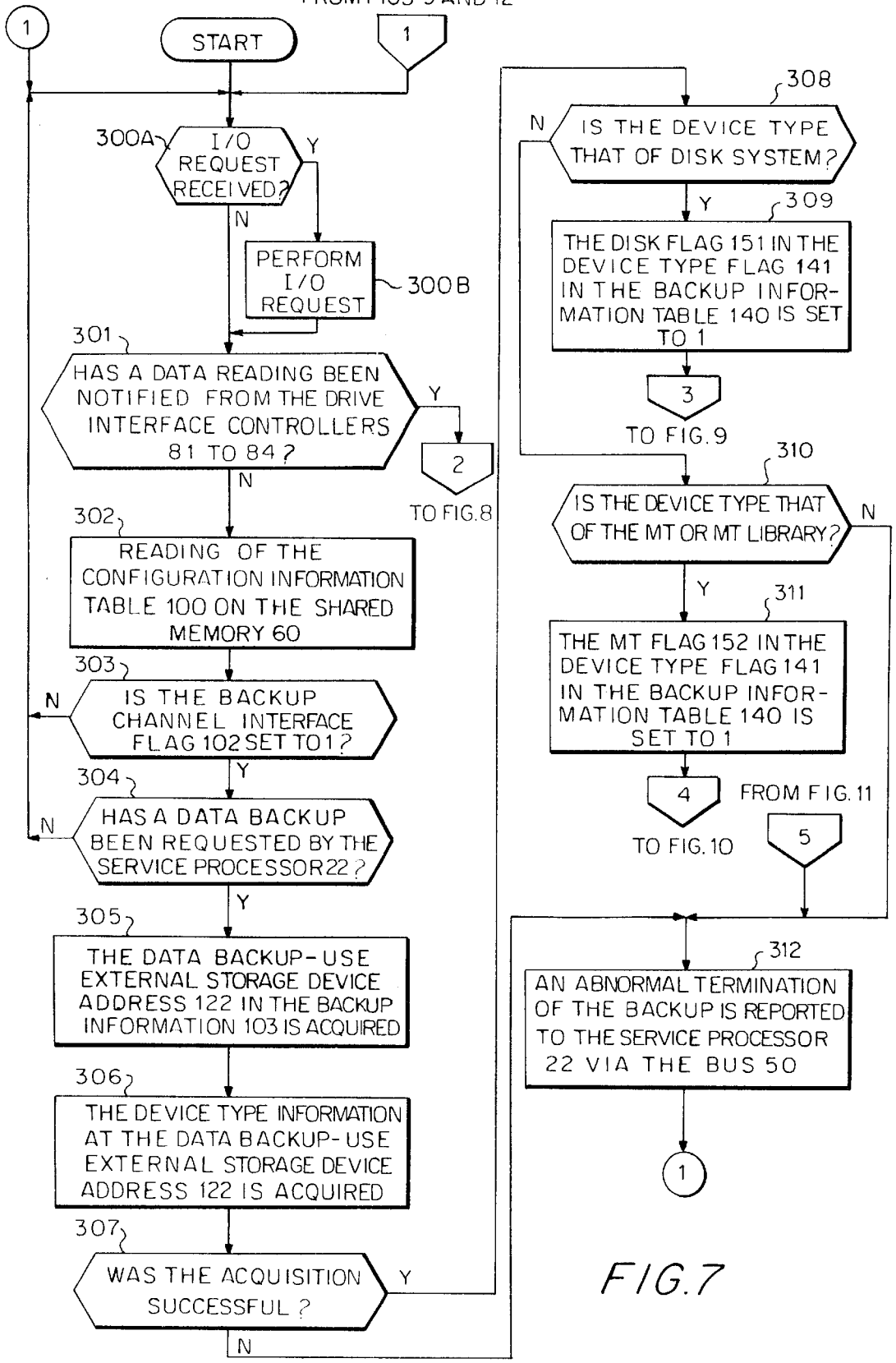
FIG. 7 is a flowchart illustrating the operation of an external storage device of the present invention.
Figure 8:
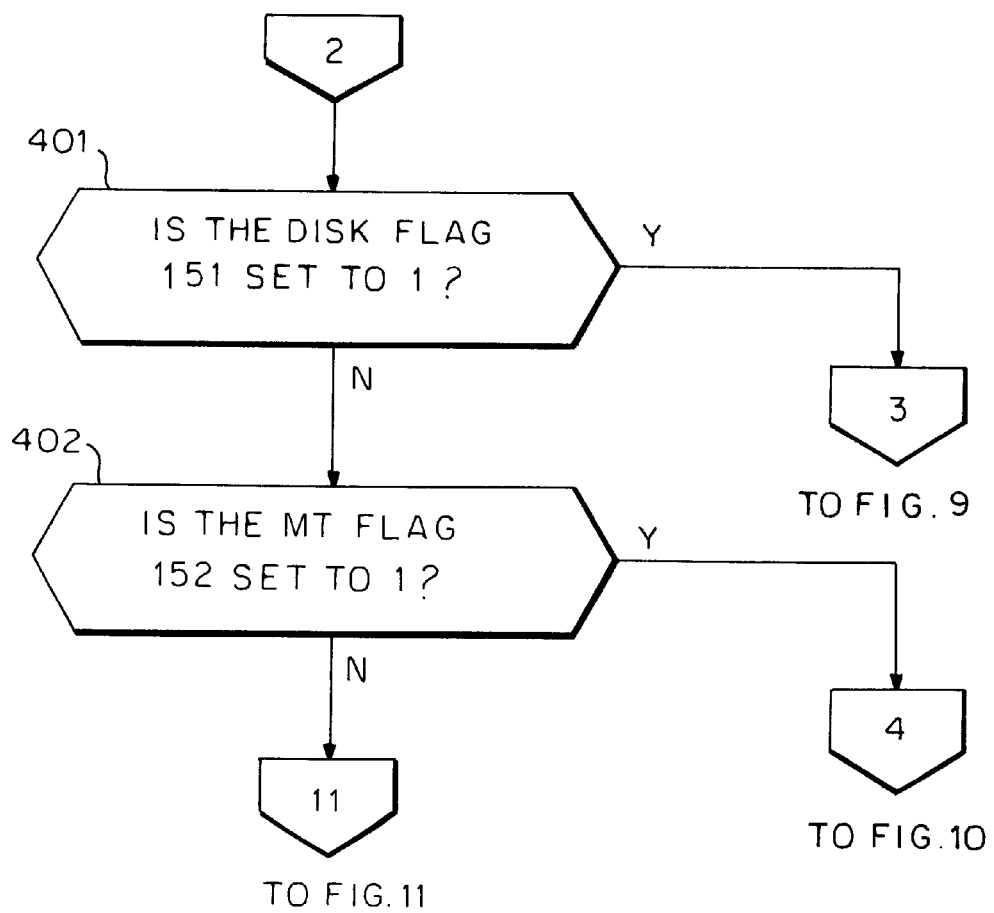
FIG. 8 is a flowchart illustrating the operation of an external storage device of the present invention.

To use the I/O count per volume as the trigger, the question in the step 304 in FIG. 7 should be changed to "Has the I/O count exceeded the specified value?" and the instruction in step 801 in FIG. 12 should be changed to "Clear the backup information table 140 and the I/O counter table of the volume concerned on the shared memory 60".

To use the read/written byte counter as the trigger, the instruction in step 304 in FIG. 7 should be changed to "Check whether the read/written byte count has exceeded the specified value of the byte count" and the instruction in step 801 in FIG. 12 should be changed to "Clear the backup information table 140 and the read/written byte counter table of the volume concerned on the shared memory 60".

If the I/O count or the read/written byte count per volume illustrated as the trigger to start the backup is few, the data backups will be performed frequently. The external storage device 20 does not accept the accesses from the large general purpose computer 1 and the personal computer 4 during the backup, thus, the data transfer which is essential is unable to be performed. That is, the more frequent the backups are, the lower the processing speed (performance) becomes. Therefore, it is desirable to set the I/O count or read/written byte count per volume so that the backup frequency is once a day, for example.

Concerning the embodiment, an explanation has been given for the example in which the data backup-use external storage device 30 is connected to the channel interface controller 45 via the cable 14. However, the invention can also be applied to a case in which two or more data backup-use external storage devices 30 are connected to the channel interface controller 45 via the cable 14. As for the cable 14, it is not limited to a simple connection cable. For example, by using an arbitrary information network medium, the data backup can be executed between the external storage device 20 located in a remote place and the data backup-use external storage device 30.

Further, with respect to the embodiment, an explanation has been given for the example in which the single data backup-use external storage device 30 is connected to the single external storage device 20 via the single channel interface controller 45 has been explained. However, it will be clearly understood that the invention can be applied to a case of a configuration in which two or more data backup-use external storage devices 30 are connected to one external storage device 20 via two or more channel interface controllers.

The embodiment is an example of a case in which the external storage device 20 is connected to the two host devices (one large general purpose computer and four personal computers). However, it will be obviously understood that the invention can also be applied to a configuration in which the three or more host devices are connected to the external storage device 20 or a configuration in which the one host device is connected to the external storage device 20.

Even further, concerning the embodiment, an explanation has been given using the magnetic disk array subsystem as an example in the embodiment. However, it will obviously be understood that the invention can be applied to an external storage subsystem of other type such as a semiconductor storage subsystem, an optical disk subsystem, a magnetic tape subsystem, a magnetic tape library subsystem, an optical disk library subsystem, or the like. An external storage device has been used as an example in the embodiment, however, it will obviously be understood that the invention can be applied to the external storage controller.

According to the data saving operation of the invention, an effect is obtained that the data saving can be performed between the external storage devices without increasing a load on the host device.

While the present invention has been described in detail and pictorially in the accompanying drawings, it is not limited to such details since many changes and modification recognizable to these of ordinary skill in the art having the benefit of this invention may be made to the invention without departing from the spirit and scope of the invention, and all such modifications as would be obvious to one skilled in the art and/or which become possible as technology develops, are intended to be included within the scope of the following claims.

We claim:

1. A data backup method in a first external storage device connected to a host device, said data backup method comprising:

forming a connection between said first external storage device and a second external storage device; and copying data stored in said first external storage device to said second external storage device via said connection, wherein said copying step is performed based on a data backup start time in configuration information stored in said first external storage device, wherein said copying step is performed when a current time of a timer corresponds to said data backup start time and said copying step is over when said data backup has been completed, wherein said configuration information comprises a type of device flag which indicated whether said second external storage device is a magnetic tape type storage device, wherein said copying step is performed corresponding to a type of storage device indicated by said type of device flag, and wherein said copying step can be performed independent of said host device.

2. A data backup method according to claim 1, wherein said configuration information further comprises:

information for designating at least one of a data storing area and a data set name in the said second external storage device at which said stored data is to be stored, and information which indicates at least one type of second external storage device.

3. An external storage device for storing data from a host and backing up stored data to a backup storage device, said external storage device comprising:

a first input/output port for inputting/outputting of data to and/or from a host;

a second input/output port, for connection to the backup storage device, for backing up stored data to the backup storage device;

a controller for controlling operation of said first and second input/output ports based on configuration information to cause copying of data stored in said external storage device from the host to said backup storage device via said second input/output port; and a processor in said external storage device for instructing an execution of said backup operation to said controller, wherein said configuration information comprises information for designating at least one of a data storing area and a data set name in the said backup storage device at which stored data is to be stored information of at least one type of storage device for managing with said second external storage device, and information including a data backup start time and a type of device flag which indicates whether said second external storage device is a magnetic tape type storage device, wherein said copying from said external storage device to said backup storage device can be performed independent of said host, and wherein said copying is performed corresponding to a type of storage device indicated by said type of device flag.

4. An external storage device according to claim 3, wherein said configuration information comprises:

information for designating at least one of a data storing area and a data set name in the said backup storage device at which said stored data is to be stored and information for managing at least one type of backup storage device.

5. A data backup method according to claim 2, further comprising:

inputting said configuration information.

6. A data backup method in a first external storage device to be connected to a host device which performs data input and/or output operations to and/or from said first external storage device, said data backup method comprising:

checking a current time of a timer in the first external storage; and copying data stored in said first storage device to said second external storage device via a connection formed between said first external storage device and said second external storage device when the current time corresponds to a data backup start time included in configuration information stored in said first external storage device and said copying step is over when said data backup has been completed, wherein said configuration information comprises a type of device flag which indicates whether said second external storage device is a magnetic tape type storage device, wherein said copying step is performed corresponding to a type of storage device indicated by said type of device flag, and wherein said copying step can be performed independent of said host device.

7. A data backup method in a first external storage device connecting to a host device, said data backup method comprising:

forming a connection between said first external storage device and a second external storage device; and copying data stored in said first external storage device to said second external storage device via said connection, wherein said copying step is performed referring a present time of a timer in said first external device an a data backup start time included in configuration information and said copying step is over when said data backup has been completed, wherein said configuration information comprises a type of device flag which indicates whether said second external storage device is a magnetic tape type storage device, wherein said copying step is performed corresponding to a type of storage device indicated by said type of device flag, and wherein said copying step can be performed independent of said host device.

* * * * *